Oct. 21, 1969  R. F. PIASECKI  3,473,768
WIRE BUNDLE CLAMP
Filed March 20, 1967
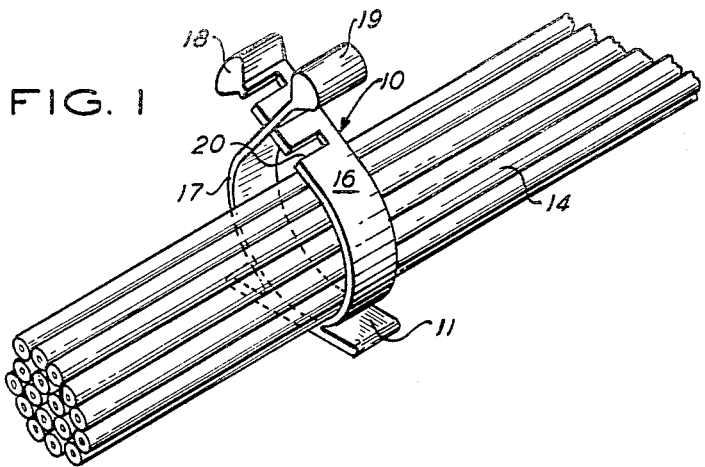
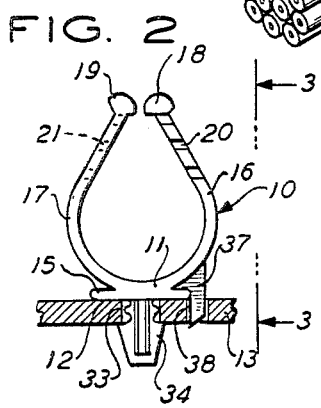
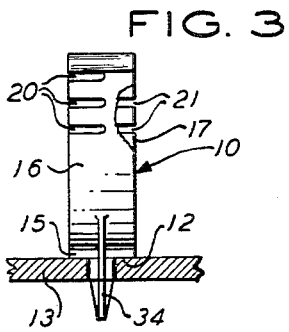
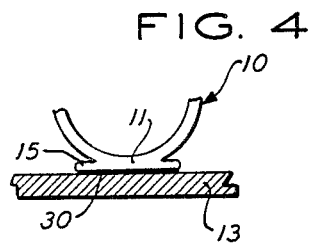
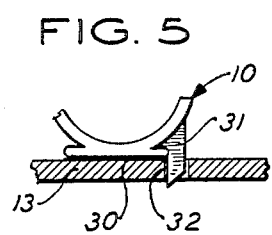
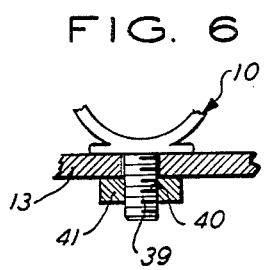
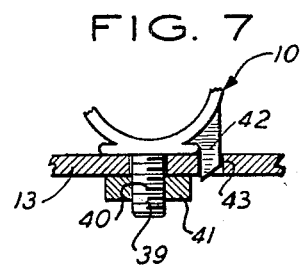
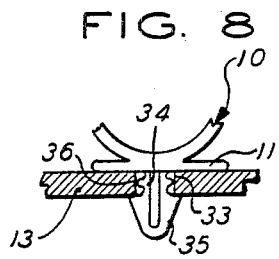
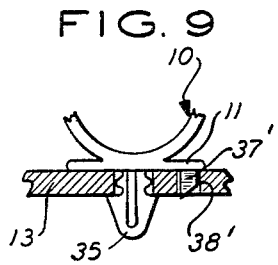
INVENTOR
R. F. PIASECKI
BY
ATTORNEY United States Patent Office 3,473,768
Patented Oct. 21, 1969

3,473,768
WIRE BUNDLE CLAMP
Raymond F. Piasecki, Hazlet, N.J., assignor to Thomas & Betts Corporation, a corporation of Delaware
Filed Mar. 20, 1967, Ser. No. 624,547
Int. Cl. F16l *3/22;* B65d *63/02, 63/10*
U.S. Cl. 248—68                     8 Claims

ABSTRACT OF THE DISCLOSURE

A clamp for positioning wires on a mounting panel having means for receiving the wires therein and means for engagement with a mounting panel to secure the assembly to the mounting panel, for temporary routing of wires to hold them securely until they are tied or as permanent clamps for so mounting wires.

---

This invention relates to a wire bundle clamp, and especially to such clamp for mounting one or more wires and bundles of wires on a mounting panel.

Makeshift and temporary expedients have been used heretofore for such purposes, resulting in loss of time, disorientation of wires, damage to the wires, "down time" losses, and impairment of efficiency.

Pursuant to the invention, a novel form of routing clamp is provided which holds the wires securely until they are tied and mounted, the clamp incorporating closure means, preferably adjustable, permitting reopening of the clamps at will for access to the wires or other purposes. The clamps are adapted to be manufactured in a range of different sizes and with novel means for mounting them on the panels, as herein set forth.

The clamps of this invention fill a pressing need in the industry for foolproof, positive means for clamping bundles of wires to mounting panels in the light of the use of numbers and bundles of long wires in increasingly complex electrical equipment. The clamps are completely reusable and are highly efficient and effective in operation, are simple to apply and to remove, and provide positive and effective mounting and retaining means for the wires.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a perspective view af a clamp embodying the invention, shown positioned about a bundle of wires, FIG. 2 is a partly sectional, elevational view, of a form of clamp embodying the invention, mounted on a panel, FIG. 3 is an end elevational view thereof, taken at line 3—3 of FIG. 2, FIG. 4 is a fragmentary, elevational, partly sectional view, showing the clamp adhesively secured to a panel, FIG. 5 is a fragmentary, elevational, partly sectional view of a similar form thereof, provided with an anti-rotation tab, positioned in an aperture in the panel, FIG. 6 is a similar fragmentary view of another form thereof, having a threaded stud extending therefrom, passed through an aperture in the panel, and engaged by a nut member, FIG. 7 is a similar view of a form thereof provided with an anti-rotation tab received in an aperture in the panel, FIG. 8 is a view corresponding to that of FIG. 2, but without the anti-rotation tab shown in FIG. 2, and FIG. 9 is a similar view of a form thereof wherein an anti-rotation tab is shown depending (as in FIG. 2) from the base of the clamp instead of from the clamp body proper.

As shown in the drawings wherein similarly corresponding parts are correspondingly numbered, the clamp 10 of the invention is provided with a mounting base 11, with means on one side 12 thereof (FIG. 2) for mounting the clamp on a mounting panel 13. The latter may be a planar or non-planar surface, depending on the particular installation involved, a planar surface being shown illustratively and without limitation thereto, in the drawings. It will be apparent from a consideration of the drawings that the configuration of the under side 12 of the base 11 may be made non-planar, if desired, to conform to the mounting panel or surface 13, or apparatus or other object to which the group or bundle of wires 14 (FIG. 1) is to be secured.

Panel 13 may be an elongated panel to which the clamps 10 may be mounted in spaced relation, or a single clamp may be mounted thereon—in either case, to secure a wire or group or bundle of wires thereto, many clamps may be so used closely or spaced apart, for example, as in the case of aircraft or other installations, wherein long lengths of wires are used.

The other side 15 of base 11 is (FIG. 2) provided with a pair of arms 16, 17 of any desired or convenient configuration, preferably defining, as shown in FIG. 2, a V- or U-shaped contour. The free ends of the arms may terminate in enlargements or handles or knobs 18, 19 to facilitate handling, as below described. Said arms may be provided with corresponding slots 20, 21 preferably extending from alternate marginal edges of the arms 16, 17 (FIGS. 3, 1, 2), preferably extending partially across the arms so that said arms may be interengaged (FIG. 1) and interlocked in a selected one of a series of positions, to define a loop conforming to the diameter of the wire bundle to be held therein. The clamp is preferably made of a plastic such as nylon or other flexible material, so that the arms may flex as above described. The stud 34 is preferably formed hollow or otherwise yieldable and expandable so as to readily compress for insertion in the panel mounting aperture and expansion beyond the aperture.

Means are provided on the side 12 of the clamp base 11 for securing the clamp to the panel 13. Said means may (FIGS. 4, 5) be layer of adhesive 30, such as (for example, and without limitation thereto) a pressure sensitive adhesive applied to side 12 of base 11 or to panel 13, and covered if desired, by a separable protective strip. The adhesive 30 may be heat sensitive or of other form or application. FIG. 5 shows the clamp provided with a non-rotation tab 31 depending therefrom and received in an aperture 32 in the panel 13. Tab 31 may completely project through the aperture in the panel (FIG. 5) or, if desired, may be formed of lesser length than the depth of aperture 32; the latter may be only a partial recess or slot.

Panel 13 may be provided with aperture 33 (FIG. 8) to receive a depending stud 34, which may be of generally V- or U-shaped configuration, the closed end 35 of the stud defining a V so that the clamp may be pressed against the panel and stud 34 passed through aperture 33. The closed end 35 of the stud will expand and engage the panel adjacent the aperture, thereby securing the clamp to the panel. The stud may be formed (FIG. 8) with a neck portion 36 connecting the stud to the clamp base 11. If desired, an anti-rotation tab (FIG. 2) may be formed on or secured to the clamp and passed through a registration aperture 38 in the panel.

In the FIG. 6 form, the stud 39 is shown threaded as at 40, nut 41 engaging the stud and panel 13 to secure the clamp 10 thereto. In that form of invention, as shown in FIG. 7, an anti-rotation tab 42 may be provided on the clamp 10, engageable with an aperture or slot 32 in panel 13.

In the FIG. 9 form, the anti-rotation stud 37' registers with but does not extend substantially beyond the aperture 38' in panel 13.

It will be noted from drawings that the stud is preferably formed hollow so as to facilitate use and application thereof as herein described.

While the foregoing disclosure of exemplary embodiments is made in accordance with the patent statutes, it is to be understood that the invention is not limited thereto or thereby, the inventive scope being defined in the appended claims.

I claim:

1. A clamp for positioning and retaining conductors upon a mounting surface comprising: a base portion; said base portion having a first surface for engagement with a mounting surface to permit the mounting of said clamp thereon; first and second upstanding arms coupled to a second surface of said base portion opposite said first surface; said first and second arms extending from said second surface of said base portion at points intermediate the ends thereof; said first and second arms terminating in enlargements to permit the manipulation of said first and second arms; at least one first slot on said first arm extending from a first edge thereof; at least one second slot on said second arm extending from a second edge thereof; said first and second slots positioned adjacent said enlargements on said first and second arms respectively; said first and second slots arranged to be engageable to hold said first and second arms in closed relationship about conductors placed above said second surface of said base portion and between said first and second arms.

2. A clamp, as defined in claim 1, further comprising: adhesive material placed upon said first surface of said base portion for mounting said clamp upon a mounting surface.

3. A clamp, as defined in claim 1, further comprising: a stud member coupled to said first surface of said base portion for mounting said clamp upon a mounting surface.

4. A clamp, as defined in claim 1, further comprising: a stud having expandable portions for grasping the surface of said mounting surface opposite the surface contacted by said base portion after said stud has been passed through an aperture in said mounting surface.

5. A clamp, as defined in claim 2, further comprising an antirotation tab coupled to said clamp to prevent rotation of said clamp with respect to said mounting surface.

6. A clamp, as defined in claim 3, further comprising an antirotation tab coupled to said clamp to prevent rotation of said clamp with respect to said mounting surface.

7. A clamp, as defined in claim 4, further comprising an antirotation tab coupled to said clamp to prevent rotation of said clamp with respect to said mounting surface.

8. A clamp, as defined in claim 5, further comprising an antirotation tab coupled to said clamp to prevent rotation of said clamp with respect to said mounting surface.

References Cited

UNITED STATES PATENTS

| 1,930,935 | 10/1933 | Hiering | 150—29 |
| 2,317,507 | 4/1943 | Zimmerman | 248—74 X |
| 2,345,279 | 3/1944 | Morehouse | 248—68 |
| 3,042,353 | 7/1962 | O'Mara | 248—74 |
| 3,154,281 | 10/1964 | Frank | 248—74 X |
| 3,214,808 | 11/1965 | Litwin | 248—74 X |
| 3,253,084 | 5/1966 | Taylor | 248—74 X |
| 3,300,173 | 1/1967 | Kennedy | 248—467 |

FOREIGN PATENTS 541,639 12/1941 Great Britain.

CHANCELLOR E. HARRIS, Primary Examiner

U.S. Cl. X.R.

24—16, 73; 248—71

PO-1050
(5/69)

UNITED STATES PATENT OFFICE
CERTIFICATE OF CORRECTION

Patent No. 3,473,768     Dated October 21, 1969

Inventor(s) Raymond F. Piasecki

It is certified that error appears in the above-identified patent and that said Letters Patent are hereby corrected as shown below:

Column 1, line 4 (Heading): delete "Delaware" and insert -- New Jersey --

SIGNED AND
SEALED
JUL 14 1970

(SEAL)
Attest:

Edward M. Fletcher, Jr.
Attesting Officer

WILLIAM E. SCHUYLER, JR.
Commissioner of Patents